United States Patent [19]

Dhar

[11] Patent Number: 5,242,764
[45] Date of Patent: Sep. 7, 1993

[54] NEAR AMBIENT, UNHUMIDIFIED SOLID POLYMER FUEL CELL

[75] Inventor: Hari P. Dhar, College Station, Tex.

[73] Assignee: BCS Technology, Inc., College Station, Tex.

[21] Appl. No.: 809,581

[22] Filed: Dec. 17, 1991

[51] Int. Cl.$^5$ .............................................. H01M 8/10
[52] U.S. Cl. ........................................ 429/30; 429/42; 29/623.4
[58] Field of Search ................... 429/30, 33, 42, 36; 29/623.4

[56] References Cited

U.S. PATENT DOCUMENTS

| | | |
|---|---|---|
| 3,498,844 | 3/1970 | Sanderson . |
| 3,507,702 | 4/1970 | Sanderson . |
| 3,528,858 | 9/1970 | Hodgdon et al. ............. 429/33 |
| 3,623,913 | 11/1971 | Adlhart et al. . |
| 3,964,930 | 6/1976 | Reiser . |
| 3,969,145 | 7/1976 | Grevstad et al. . |
| 4,192,906 | 3/1980 | Maru . |
| 4,276,355 | 6/1981 | Kothmann et al. . |
| 4,469,579 | 9/1984 | Covitch et al. . |
| 4,661,411 | 4/1987 | Martin et al. . |
| 4,769,297 | 9/1988 | Reiser et al. . |
| 4,795,536 | 1/1989 | Young et al. . |
| 4,795,683 | 1/1989 | McElroy et al. . |
| 4,797,185 | 1/1989 | Polak et al. . |
| 4,818,637 | 4/1989 | Molter et al. . |
| 4,826,741 | 5/1989 | Aldhart et al. . |
| 4,826,742 | 5/1989 | Reiser . |
| 4,876,115 | 10/1989 | Raistrick . |
| 4,988,582 | 1/1991 | Dyer . |
| 5,084,144 | 1/1992 | Reddy et al. ............. 429/42 X |

OTHER PUBLICATIONS

R. Moore and C. Martin, "Morphology and Chemical Properties of the Dow Perfluorosulfonate Ionomers," vol. 22, No. 9, p. 3594 (1989).
E. Ticianelli, et al., "Methods to Advance Technology of Proton Exchange Membrane Fuel Cells," J. Electrochemical Soc, vol. 135, No. 9, p. 2209 (Sep. 1988).
E. Ticianelli, et al., "Localization of Platinum in Low Catalyst Loading Electrodes to Attain High Power Densities in SPE Fuel Cells", J. Electroanalysis Chem., vol. 251, p. 275 (1988).
S. Srinivasan, et al., "Advances in Solid Polymer Electrolyte Fuel Cell Technology with Low Platinum Loading Electrodes," J. Power Sources, vol. 22, p. 359 (1988).
D. Watkins, et al., "Canadian Solid Polymer Fuel Cell Development," 32nd International Power Sources Symposium, Jun. 9-12, 1986. The Electrochemical Society, Pennington, N.J., p. 782.
K. Prater, "The Solid Polymer Fuel Cell—A Viable Product Today," Proceedings of the 4th Canadian Hydrogen Workshop, Nov. 1-2, 1989, Canadian Hydrogen Association, Ottawa, Canada.

*Primary Examiner*—Stephen Kalafut
*Attorney, Agent, or Firm*—Pravel, Hewitt, Kimball & Krieger

[57] ABSTRACT

The solid polymer fuel cell (SPFC), also known as the solid polymer electrolyte (SPE ®) fuel cell, sold by Hamilton Standard, a Division of United Technologies Corporation, of Hartford, Conn., needs simplification for the fuel to become commercially viable. A simplified design is thus sought that would avoid prior humidification of reactants and the membrane, i.e., the electrolyte. A proton conducting material, such as perfluorocarbon copolymer, is deposited as the electrolyte on top of the catalytic side of the porous gas diffusion electrodes acting as anode and cathode. With sufficient deposits on both electrodes, it is then possible to avoid the use of electrolyte membrane which is used in the state-of-the-art solid polymer fuel cell design. The system operates at near ambient temperatures, pressures and at near stoichiometric reactant flows without requiring extra humidification of the reactant gases and the electrolyte.

10 Claims, 4 Drawing Sheets

NEAR AMBIENT, UNHUMIDIFIED SOLID POLYMER FUEL CELL

BACKGROUND OF THE INVENTION

This invention relates to a simplified fuel cell system. According to one aspect, the invention relates to a fuel cell using a solid polymer electrolyte.

Fuel cells have been used as a source of primary power in remote areas where the usual sources of power are unavailable and where service and maintenance of equipment would be limited. Examples in this area are unattended communications repeaters, navigational aids, and weather and oceanographic stations. For such applications, the power system must be self-contained and the reliability of the system is of maximum importance.

Generally, a fuel cell is a device which converts the energy of a chemical reaction into electricity. It differs from a battery in that the fuel and oxidant are stored external to the cell, which can generate power as long as the fuel and oxidant are supplied. A fuel cell produces an electromotive force by bringing the fuel and oxidant in contact with two suitable electrodes and an electrolyte. A fuel (for example, hydrogen gas) is introduced at one electrode where it reacts electrochemically with the electrolyte to impart electrons to the fuel electrode. Protons are formed by dissociation of the hydrogen at the first electrode and pass through the electrolyte to the second electrode. Simultaneously, an oxidant (for example, oxygen gas or air) is introduced to the second electrode where it reacts electrochemically with the electrolyte to consume the electrons and the protons at the second electrode. The halfcell reactions at the two electrodes are, respectively, as follows:

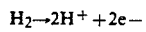

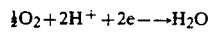

Connecting the two electrodes through an external circuit causes an electrical current to flow in the circuit and withdraws electrical power from the cell. The overall fuel cell reaction produces electrical energy which is the sum of the separate halfcell reactions written above. A byproduct of the reaction is formed as well as some heat.

In practice, fuel cells are not operated as single units; rather, they are connected in a series, stacked one on top of the other, or placed side by side. A series of fuel cells, referred to as a fuel cell stack, is normally enclosed in a housing. The fuel and oxidant are directed with manifolds to the electrodes, and cooling is provided either by the reactants or by a cooling medium. Also within the stack are current collectors, cell-to-cell seals, insulation, piping, and instrumentation. The stack, housing, and associated hardware make up the fuel cell module.

Fuel cells can be classified by the type of electrolyte, i.e., liquid or solid that they contain. The present invention improves upon fuel cells in which the electrolyte is a solid (for example, a solid polymer also known as a proton exchange membrane). This type of fuel cell operates best when the electrolyte membrane is kept moist with water because the membrane will not operate efficiently when it is dry. The membrane requires constant humidification during operation of the fuel cell, normally by adding water to the reactant gases, usually hydrogen and oxygen, that pass by the membrane on each side of the membrane/electrodes assembly. The accessories required for humidification add instrumentation and hence weigth to the fuel cell.

The proton exchange membrane used in a solid polymer fuel cell acts as the electrolyte as well as a barrier for preventing the mixing of the reactant gases. An example of a suitable membrane is a copolymeric perfluorocarbon material containing a basic unit of fluorinated carbon chain and a sulphonic acid group. There may be variations in the molecular configurations of this membrane. One membrane commonly used as a fuel cell solid electrolyte is a well known perflourocarbon material sold by E. I. DuPont de Nemours under the trademark "Nafion." Dow Chemicals Company has also developed proton exchange membranes that are still in the experimental stage. Excellent performances are obtained using these membranes if the fuel cells are operated under fully hydrated, essentially water-saturated conditions. As such, the membrane must be continuously humidified.

In addition to the humidification problem, the membrane contributes to the ohmic resistance within the cell itself and, in turn, lowers fuel cell performance. If the fuel cell must perform at a lower temperature and pressure when the reaction kinetics of the two halfcell reactions shown above are slower, the use of less membrane as the electrolyte becomes imperative.

Cooling and humidification requirements increase the cost and complexity of the fuel cell, reducing its use as an alternative energy supply in many applications. Accordingly, there is a need for a fuel cell with no requirement for humidification which operates at near ambient conditions.

SUMMARY OF THE INVENTION

According to one embodiment of the present invention, there is provided a membrane which does not need the humidification of the prior art, thus allowing for less complicated and lighter modules.

One embodiment of the invention provides a fuel cell for generating electricity from a reaction between a fuel source and an oxidant source, the fuel cell comprising: a first porous gas diffusion electrode; a second porous gas diffusion electrode, the second electrode defining an electric field with the first electrode; a first electrolyte deposit placed on the first electrode; a second electrolyte deposit placed on the second electrode; and an electrolyte membrane positioned between and in contact with the first and second electrolyte deposit, the membrane having a central hole.

According to a more specific embodiment, the first and second electrolyte deposit comprises a perfluorocarbon copolymer proton conducting material.

According to a further embodiment, the first and second electrolyte deposit in the dry state comprises about 10 to 20 mg per about 5 cm$^2$ electrode area of about 5% solution of Nafion.

According to yet another embodiment of the invention, the electrolyte membrane comprises a perfluorocarbon copolymer proton conducting material.

According to still a further embodiment of the invention, there is provided a fuel cell comprising: a fuel electrode and an oxidant electrode; an electrolyte member between and in contact with the fuel electrode and the oxidant electrode, the electrolyte member defining a first and second electrolyte deposit on opposing surfaces of the electrodes and a electrolyte membrane sheet, having a central hole, positioned between and on the periphery of the deposits; a fuel distribution member in flow communication with the fuel electrode for supplying fuel thereto; and an oxidant distribution member in flow communication with the oxidant electrode for supplying an oxidant thereto.

According to yet another embodiment of the invention, there is provided a fuel cell comprising: an oxidizing electrode and a reducing electrode; electrolyte means positioned therebetween, the electrolyte means defining a first and second electrolyte deposit on opposing surfaces of the electrodes and a electrolyte membrane sheet, having a central hole, positioned between and on the periphery of the deposits; means for supplying a gaseous fuel to the oxidizing electrode; and means for supplying a gaseous oxidant to the reducing electrode.

According to still a further embodiment, there is further provided a method for assembling a fuel cell comprising the steps of: placing a first porous gas diffusion electrode parallel to a second porous gas diffusion electrode, the first and second electrode having two sides, a backing layer side and a catalyst side, wherein the catalyst side of the first and second electrode face each other; first attaching a first catalyst layer on the catalyst side of the first electrode; second attaching a second catalyst layer on the catalyst side of the second electrode; first depositing a first electrolyte on the first catalyst layer; second depositing a second electrolyte on the second catalyst layer; and positioning an electrolyte membrane between and in contact with the first and second electrolyte, the membrane having a central hole.

A small amount of electrolyte deposit on an electrode allows for operation under much reduced ohmic resistance. A reduced ohmic resistance compensates for the kinetic advantage that is obtainable for the above two halfcell reactions at a higher temperature and pressure. Thus, the fuel cell operation becomes feasible at a lower temperature and pressure.

The above conditions allow the electrolyte to retain sufficient water that is formed by the electrochemical reaction during fuel cell operation allowing a continuous cell performance without membrane failure.

BRIEF DESCRIPTION OF THE DRAWINGS

The accompanying drawings, which are incorporated in and form a part of the specification, illustrate the embodiments of the present invention, and, together with the description, serve to explain the principals of the invention. In the drawings.

It is to be noted that the drawings illustrate only typical embodiments of the invention and are therefore not be to considered limiting of its scope, for the invention will admit to other equally effective embodiments.

DETAILED DESCRIPTION OF THE INVENTION

Figure 1:
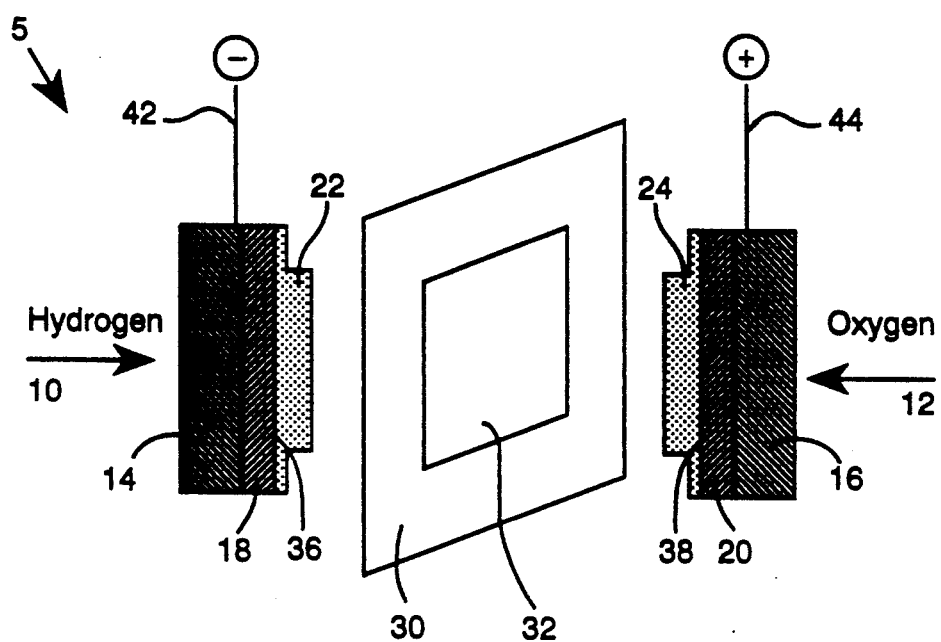
FIG. 1 is a schematic cross-section of an embodiment of the invention in which a fuel cell is provided having two electrodes and a membrane with a central hole.
Figure 2:
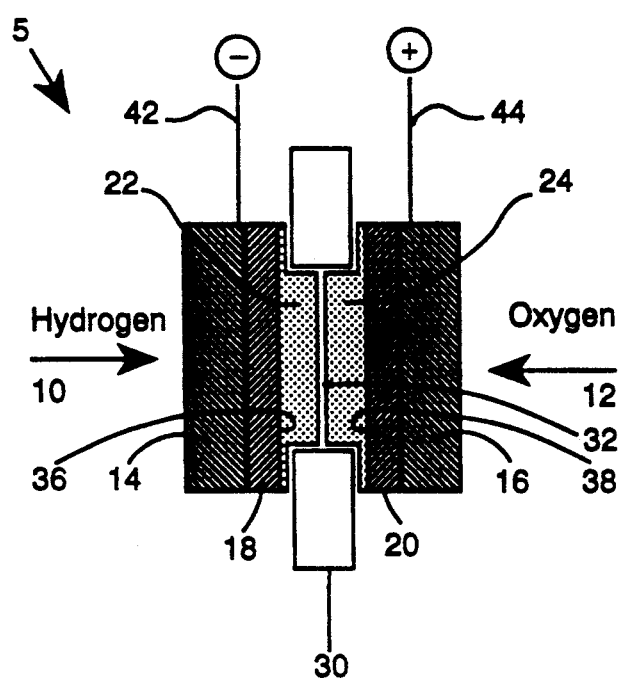
FIG. 2 is a schematic cross-section of the membrane and electrodes assembly seen in FIG. 1.

Referring to FIGS. 1 and 2, there is shown in schematic cross-section a fuel cell having features of the present invention. Fuel cell assembly (5) includes gaseous reactants which include a fuel source (10) and an oxidizer source (12). The gases (10) and (12) diffuse through anode backing layer (14) and cathode backing layer (16), respectively, to porous electrodes forming anode (18) and cathode (20). The electrodes (18) and (20) have deposits of solid electrolyte (22) and (24). These electrolyte deposits (22) and (24), together with an oversized membrane (30) positioned therebetween with a hole (32), separate the anode (18) and the cathode (20). Anode connection (42) and cathode connection (44) are used to interconnect with an external circuit or with other fuel cell assemblies. The membrane/electrodes assembly was prepared by putting the components together and pressing for about 90 seconds at a pressure of about 1,000 psig and at a temperature of about 130° C.

Suitable fuel sources (10) that are consumed by assemblies made in accordance with the invention in order to produce electrical energy are hydrogen-containing materials (for example, water, methane, and methanol). According to some embodiments, the fuels are supplied to the assemblies in liquid form, while according to alternative embodiments, fuels are supplied in gaseous form. According to still further embodiments, hydrogen is obtained from reversible metal hydride formers, (for example, $LaNi_5$, $FeTi$ and $MmNi_{4.15}Fe_{0.85}$, where Mm is a mischmetal, among others).

Furthermore, many suitable oxidizer sources (12) or oxidizer species are available for combining with the fuel to provide a mixture suitable for powering the fuel cell assemblies described herein. In practice, the most common oxidizer is gaseous oxygen or air.

The anode (18) and cathode (20) halfcell hydrogen and oxygen reactions require catalysts to proceed at useful rates. As such, thin catalyst layers (36) and (38) are placed on the first electrode catalyst side and the second electrode catalyst side. Various materials are suitable for forming such catalyst layers. These materials include iridium, platinum, palladium, gold, nickel, and various alloys of these materials. Other suitable catalytic materials include non-metals, (for example, electronically conducting mixed oxides with a spinel or perovskite structure). According to a more specific embodiment, the hydrogen electrode catalyst is platinum, and the oxygen electrode catalyst is either platinum or another oxygen reducing catalyst (for example, a macrocyclic chelate compound). The amount of catalyst used in one embodiment is about 1 mg platinum per $cm^2$ of electrode area. It is foreseen that increasing the platinum loading or the efficiency of platinum utilization in the electrodes will improve the fuel cell performance.

According to one embodiment of the invention, a perfluorinated sulfonic acid copolymer known under the trademark Nafion and available from E. I. DuPont de Nemours was used as the electrolyte deposits (22) and (24) on the electrode. Nonetheless, any perfluorocarbon copolymer that could be used as an electrolyte membrane in a solid polymer fuel cell, such as those made by Dow Chemicals Company, would be equally suitable in this invention. The electrolyte deposit can be made of a material that is characterized by a high conductivity for hydrogen ions ($H^+$) or hydronium ions ($H_3O^+$). Additionally, each electrolyte deposit is permeable to the fuel, to the oxidizer, and to the products of the reaction between the fuel and the oxidizer. Further, each electrolyte deposit constitutes an electron insulator, with a resistivity of at least about $10^6$ ohm-centimeters. Moreover, the solid electrolyte is capable of being made in very thin layers, often below one micrometer in thickness. Selected hydrated aluminum oxides (for example, pseudoboehmite), which possesses the required hydrogen ion conductivity, electronic resistivity, and permeability to fuel, oxidizer, and products of the reaction between them, are also acceptable.

The amount of electrolyte deposit that is to be made on an electrode should be sufficient to prevent reactant cross-overs through the electrodes. According to one embodiment, the amount of electrolyte deposit is in the range of about 10 mg to 20 mg per about 5 $cm^2$ electrode area. The exact thickness of the deposit was not determined; however, the deposit is thicker at the central part of the electrode than it is around the electrode edges. According to the same embodiment, the electrolyte deposit was made from a 5% solution of Nafion 117, in lower aliphatic alcohols and 10% water, sold by Aldrich Chemical of Milwaukee, Wis. Nafion 117 becomes soluble in lower aliphatic alcohols (for example, ethanol and isopropanol) in a closed container heated in the temperature range of about 200°-300° C. for a period of about two to five hours. The solution is preferably applied to the catalyst layer of the electrodes by successive coatings made with a small brush. After each coating is applied, the electrode is heated in an oven of about 80° C. for about fifteen to twenty minutes and weighed until a required amount of solid electrolyte is deposited onto the electrode surface. The deposited layer of electrolyte thus attaches to the catalyst layer of the electrode. The use of Nafion as a solid polymer electrolyte membrane is more particularly described in U.S. Pat. No. 4,469,579, the disclosure of which is incorporated herein by reference.

Embodiments of the present invention also include a slightly oversized solid electrolyte membrane (30), positioned between and in contact with the electrolyte deposits (22) and (24), with the central part cut out. The purpose of the hole (32) in the membrane is to avoid an additional electrolyte on top of the deposited layer and hence to avoid an unnecessary increase in the electrolyte resistance. The purpose of the oversized membrane is for gasketting the perimeter of the electrodes and preventing reactant cross-overs around the electrodes. Examples of suitable membranes include Nafion and any other proton exchange membrane suitable for solid polymer fuel cell work. Moreover, any gasketting material that can effectively attach to the electrode perimeter and act as a barrier between the hydrogen and oxygen gases would be suitable instead of a proton exchange membrane.

It is believed that the fuel cell performance will vary proportionately with the ratio of the area of the cutout portion of the membrane to the total electrode area. This ratio determines the area of electrode having the least resistive electrolyte pathway. For a small electrode fuel cell having a cutout portion area of 2.25 $cm^2$ and a total electrode area of 5 $cm^2$, this ratio is 45%. This would mean that the area of the electrode covered by the gasketting membrane was 2.75 $cm^2$, or a gasket 0.37 cm wide all around the electrode perimeter. If the width of the gasket is kept the same (0.37 cm) for a bigger electrode fuel cell, the effective electrode area would be greater for that electrode. It can be calculated that for a 25 $cm^2$ electrode, the ratio is 73%, and for a 100 $cm^2$ electrode, 86%. Therefore, it is expected that for a larger electrode area, the fuel cell performance will improve.

As is usual in fuel cell experiments involving solid polymer electrolytes, an initial period of conditioning for the fuel cell is allowed. The initial performance for the fuel cell is low; however, the voltage and current of the cell gradually increase upon running the cell for some period of time. This conditioning can be done at a temperature of about 30° to 40° C., polarizing the cell for a period of about 1 to 5 days.

The practice of the invention requires no additional humidification of the electrolyte or the reactants. Therefore, the water generated by the fuel cell reaction is not carried away from the electrolyte by a high flow of reactants through the fuel cell or through operation of the cell at high temperature. The preferable conditions for fuel cell operation are thus near stoichiometric flow of the reactants and substantially ambient temperature of the fuel cell.

The following examples are introduced to illustrate further the novelty and utility of the present invention but not with the intention of unduly limiting the same.

EXAMPLE 1

Figure 3:
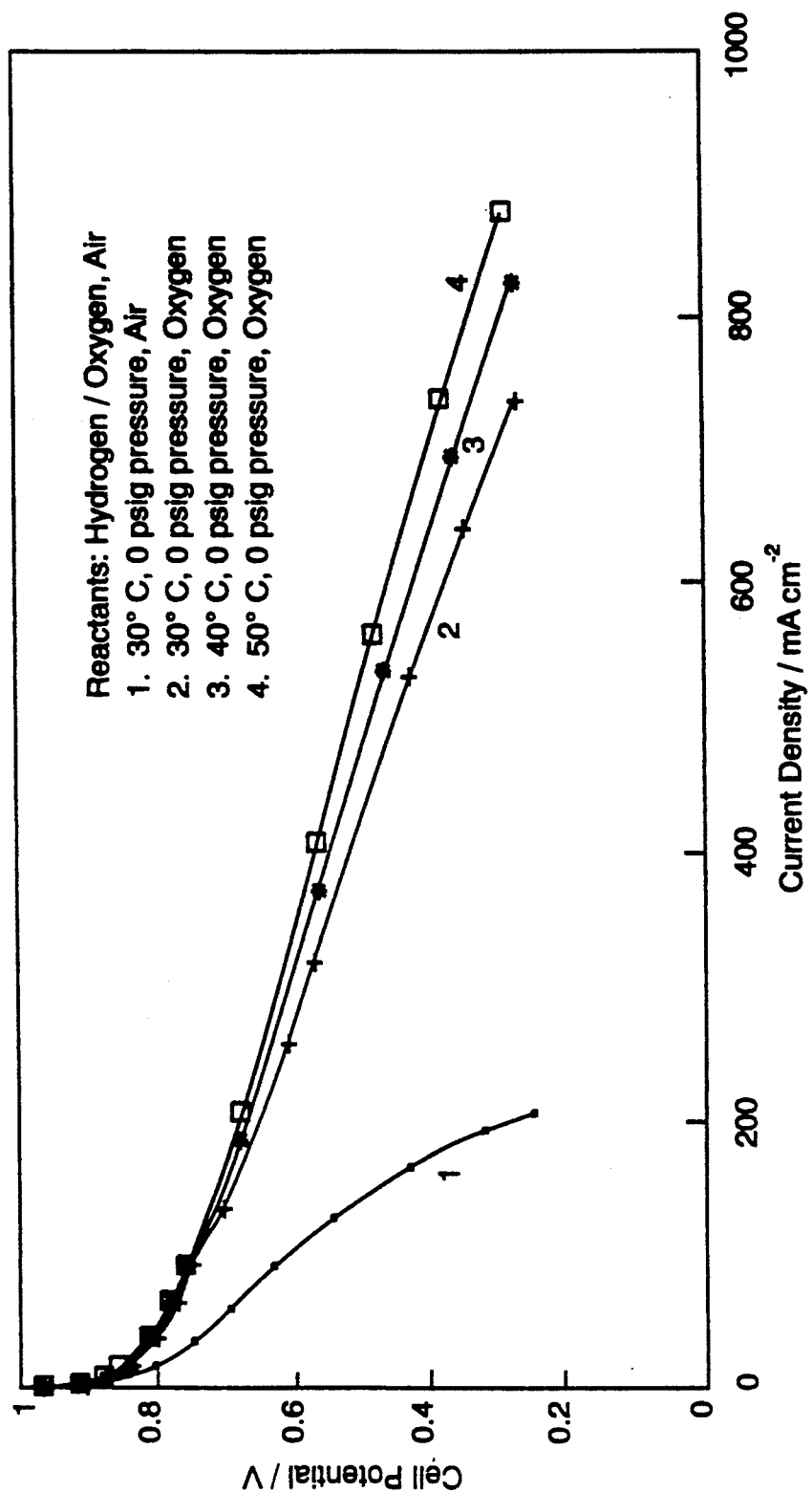
FIG. 3 is a graph of cell potential versus current density comparing a fuel cell at various temperatures and with various oxidants.

The graph in FIG. 3 shows the performance of a fuel cell in the form of a current-potential plot for a fuel cell using electrodes obtained from E-Tek, Inc. of Framingham, Mass. The catalyst is 20% platinum-on-carbon having a loading of 1 mg platinum per $cm^2$ of electrode. The electrode area for the anode and the cathode is 5 $cm^2$ each. The amount of electrolyte in the dry state deposited on each electrode was 15 mg. The fuel cell as described above was conditioned for three days before collection of the performance data. The gas flow for the hydrogen and oxygen was maintained near stoichiometric to the current drawn—approximately 1.1 to the stoichiometric current. No humidification was provided either for cell conditioning or for data collection. The results are presented at three temperatures, 30° C., 40° C. and 50° C. Both hydrogen and oxygen entered separate channels through the bottom of the cell and the unreacted excess exited through channels at the top. Approximately 4 inches of water back pressure was maintained for both gases. As expected, the cell performance increased with increasing temperature. At 50° C. and 300 $mA/cm^2$ of current, the cell voltage was 0.655 V, while at 30° C. and under similar conditions of current, the cell voltage was 0.615 V.

This fuel cell was also run with air as the oxidant at 30° C. To compensate for lower oxygen content, the air flow volume was maintained five times that for the stoichiometric flow of oxygen alone. The air performance is also shown in FIG. 3. Since a high flow of a reactant tends to evaporate the generated water in the fuel cell quickly, the use of air as an oxidant at a higher temperature is not preferred at atmospheric pressure. However, it is foreseen that the use of air is feasible, if the cell is operating at a lower temperature and higher pressure.

EXAMPLE 2

Figure 4:
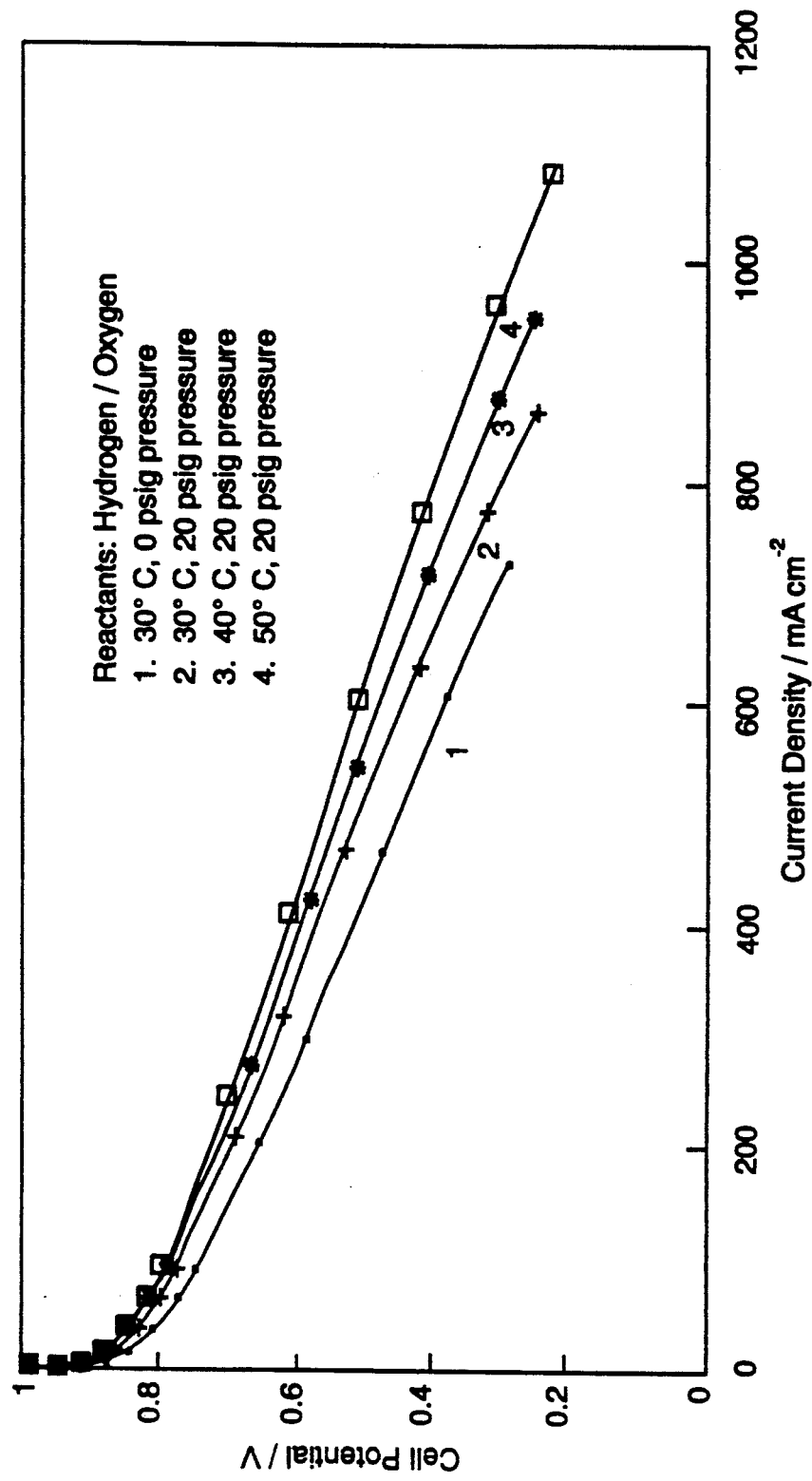
FIG. 4 is a graph of cell potential versus current density comparing a fuel cell at various temperatures and pressures.

Referring now to FIG. 4, there is a graph which shows temperature and pressure effects on fuel cell performance of a cell assembled with electrodes having electrolyte deposits of 19 and 20 mg, respectively. Other conditions for cell assembly and operation were similar to that described above. Curves 1 and 2 show effect of increasing pressure from 0 to 20 psig for both hydrogen and oxygen gases and the cell temperature of 30° C. With increasing pressure of 20 psig, the cell performance at 300 mA/cm$^2$ increases from 0.59 V to 0.64 V. Curves 2, 3, and 4 show temperature effect at the high pressure of 20 psig. At 50° C., and 300 mA/cm$^2$ current density, the cell voltage was 0.68 volts, an improvement of 25 millivolts over the 0 psig data of FIG. 3.

According to a further embodiment of the invention, 10 mg of electrolyte was deposited on each electrode. The cell performance at 30° C. and 300 mA/cm$^2$ current density was 0.59 V and at 50° C. and the same current as above, the cell performance was 0.655 V.

The above embodiments are given by way of example and are not intended as limitations as further embodiments and advances will occur to those of skill in the art which practice the present invention.

What is claimed is:

1. A fuel cell for generating electricity from a reaction between a fuel source and an oxidant source, the fuel cell comprising:
    a first porous gas diffusion electrode;
    a second porous gas diffusion electrode, the second electrode defining an electric field with the first electrode;
    a first electrolyte deposit placed on the first electrode;
    a second electrolyte deposit placed on the second electrode; and
    an electrolyte membrane positioned between and in contact with the first and second electrolyte deposit, the membrane having a central hole.

2. A fuel cell as in claim 1, wherein the first and second electrolyte deposit comprises a perfluorocarbon copolymer proton conducting material.

3. A fuel cell as in claim 2, wherein the first and second electrolyte deposit in the dry state comprises about 10 to 20 mg per about 5 cm$^2$ electrode area of about 5% solution of Nafion.

4. A fuel cell as in claim 1, wherein the electrolyte membrane comprises a perfluorocarbon copolymer proton conducting material.

5. A fuel cell comprising:
    a fuel electrode and an oxidant electrode;
    an electrolyte member between and in contact with the fuel electrode and the oxidant electrode, the electrolyte member defining a first and second electrolyte deposit on opposing surfaces of the electrodes and a electrolyte membrane sheet, having a central hole, positioned between and on the periphery of the deposits;
    a fuel distribution member in flow communication with the fuel electrode for supplying fuel thereto; and
    an oxidant distribution member in flow communication with the oxidant electrode for supplying an oxidant thereto.

6. A fuel cell comprising:
    an oxidizing electrode and a reducing electrode;
    electrolyte means positioned therebetween, the electrolyte means defining a first and second electrolyte deposit on opposing surfaces of the electrodes and a electrolyte membrane sheet, having a central hole, positioned between and on the periphery of the deposits;
    means for supplying a gaseous fuel to the oxidizing electrode; and
    means for supplying a gaseous oxidant to the reducing electrode.

7. A method for assembling a fuel cell comprising the steps of:
    placing a first porous gas diffusion electrode parallel to a second porous gas diffusion electrode, the first and second electrode having two sides, a backing layer side and a catalyst side, wherein the catalyst side of the first and second electrode face each other;
    first attaching a first catalyst layer on the catalyst side of the first electrode;
    second attaching a second catalyst layer on the catalyst side of the second electrode;
    first depositing a first electrolyte on the first catalyst layer;
    second depositing a second electrolyte on the second catalyst layer; and
    positioning an electrolyte membrane between and in contact with the first and second electrolyte, the membrane having a central hole.

8. A fuel cell as in claim 1, wherein the electrolyte membrane comprises an electrolyte material which attaches to the electrode perimeter and acts as a barrier between the fuel source and the oxidant source.

9. A fuel cell for generating electricity from a reaction between a fuel source and an oxidant source, the fuel cell comprising:
    a first porous gas diffusion electrode;
    a second porous gas diffusion electrode, the second electrode defining an electric field with the first electrode;
    a first electrolyte deposit placed on the first electrode;
    a second electrolyte deposit placed on the second electrode;
    an electrolyte membrane positioned between the first and second electrolyte deposit, the membrane having a central hole; and
    wherein said first and second electrodes, said first and second electrolyte deposits and said electrolyte membrane are assembled into operative connection with one another by pressing them together for a sufficient period of time at a high pressure and at an elevated temperature.

10. A fuel cell as in claim 9, wherein said sufficient period of time is approximately 90 seconds, said high pressure is approximately 1,000 psig and wherein said elevated temperature is approximately 130° C.

* * * * *

UNITED STATES PATENT AND TRADEMARK OFFICE
CERTIFICATE OF CORRECTION

PATENT NO. : 5,242,764

DATED : September 7, 1993

INVENTOR(S) : Hari P. Dhar

It is certified that error appears in the above-identified patent and that said Letters Patent is hereby corrected as shown below:

Title Page:

In the Abstract, line 5, please replace "fuel to" with --fuel cell to--.

In col. 2, line 4, please replace "weigth" with --weight.

In col. 5, line 29, please replace "C." with --C--.

In col. 5, line 34, please replace "C." with --C--.

In col. 6, line 14, please replace "C." with --C--.

In col. 6, line 44, please replace "C." with --C--.

In col. 6, line 45, at the first occurrence, please replace "C." with --C--.

In col. 6, line 50, please replace "C." with --C--.

In col. 6, line 52, please replace "C." with --C--.

In col. 7, line 11, please replace "C." with --C--.

In col. 7, line 17, please replace "C." with --C--.

UNITED STATES PATENT AND TRADEMARK OFFICE
CERTIFICATE OF CORRECTION

PATENT NO. : 5,242,764
DATED : September 7, 1993
INVENTOR(S) : Hari P. Dhar

It is certified that error appears in the above-indentified patent and that said Letters Patent is hereby corrected as shown below:

In col. 7, line 18, please replace "C." with --C--.

Signed and Sealed this

Fifth Day of April, 1994

Attest:

BRUCE LEHMAN

*Attesting Officer*     *Commissioner of Patents and Trademarks*